US010430215B1

(12) United States Patent
Roy et al.

(10) Patent No.: US 10,430,215 B1
(45) Date of Patent: Oct. 1, 2019

(54) METHOD AND SYSTEM TO TRANSFER DATA BETWEEN HARDWARE EMULATOR AND HOST WORKSTATION

(71) Applicant: CADENCE DESIGN SYSTEMS, INC., San Jose, CA (US)

(72) Inventors: Rajiv Roy, Fremont, CA (US); Cheoljoo Jeong, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 716 days.

(21) Appl. No.: 14/750,660

(22) Filed: Jun. 25, 2015

(51) Int. Cl.
G06F 9/455 (2018.01)

(52) U.S. Cl.
CPC .................... *G06F 9/455* (2013.01)

(58) Field of Classification Search
CPC ........................................................ G06F 9/455
See application file for complete search history.

(56) References Cited

U.S. PATENT DOCUMENTS

| | | | | |
|---|---|---|---|---|
| 3,551,894 A * | 12/1970 | Lehman | ............... | G06F 13/4243 340/10.31 |
| 5,870,588 A * | 2/1999 | Rompaey | ............ | G06F 17/5022 703/13 |
| 6,334,175 B1 * | 12/2001 | Chih | ........................ | G06F 12/06 710/51 |
| 6,788,613 B1 * | 9/2004 | Gratrex | ................ | G11C 7/1006 365/189.02 |
| 8,327,039 B2 * | 12/2012 | Chou | ....................... | G06F 13/28 710/22 |
| 8,806,259 B2 * | 8/2014 | Lewis | ................... | G11C 7/1075 713/400 |
| 2002/0152060 A1 * | 10/2002 | Tseng | ...................... | G06F 13/22 703/17 |
| 2003/0225565 A1 * | 12/2003 | Garcia | ................ | G06F 17/5022 703/23 |

(Continued)

OTHER PUBLICATIONS

"Standard Co-Emulation Modeling Interface (SCE-MI) Reference Manual." Version 2.0 (Mar. 22, 2007): Accellera [retreived on Oct. 4, 2017]. Retrieved from <http://accellera.org/images/downloads/standards/sce-mi/SCE_MI_v20-3-22-2007.pdf>.*
"PIC32 Family Reference Manual." DS60001117H, Section 31. DMA Controller (2013) [retrieved on Oct. 3, 2017]. Retrieved from <http://ww1.microchip.com/downloads/en/DeviceDoc/60001117H.pdf>.*

(Continued)

*Primary Examiner* — Aniss Chad
*Assistant Examiner* — Alfred H B Wechselberger
(74) *Attorney, Agent, or Firm* — Eric L. Sophir; Dentons US LLP

(57) ABSTRACT

An emulation system comprises a first computing device having a processor configured to generate a synchronization clock signal on receiving a data transfer request. The first computing device further comprises a first non-transitory machine-readable memory buffer storing machine readable binary data. The emulation system further comprises an emulator controller configured to receive the synchronization clock signal from the first computing device. The emulation system further comprises a memory port controller configured to initiate transfer of the machine readable binary data from the first non-transitory machine-readable memory buffer to a non-transitory machine-readable hardware memory, in response to receiving the synchronization clock signal from the emulator controller, during a latency period of the synchronization clock signal.

18 Claims, 6 Drawing Sheets

(56) References Cited

U.S. PATENT DOCUMENTS

| | | | | |
|---|---|---|---|---|
| 2006/0198384 A1* | 9/2006 | Gresham | ................... | H04J 3/02 |
| | | | | 370/412 |
| 2011/0235459 A1* | 9/2011 | Ware | ........................ | G11C 7/04 |
| | | | | 365/233.11 |
| 2011/0264435 A1* | 10/2011 | Jamnejad | .............. | G06F 11/261 |
| | | | | 703/28 |
| 2012/0304009 A1* | 11/2012 | Oshima | ............ | G01R 31/31937 |
| | | | | 714/33 |
| 2013/0262073 A1* | 10/2013 | Asaad | ................. | G06F 17/5027 |
| | | | | 703/14 |

OTHER PUBLICATIONS

Kim et al. "Automatic Generation of Software/Hardware Co-Emulation Interface for Transaction-Level Communication." 2005 IEEE VLSI-TSA International Symposium on VLSI Design, Automation and Test (2005) [retrieved on Oct. 3, 2017]. Retrieved from <http://ieeexplore.ieee.org/abstract/document/1500054/>.*

Hassoun et al. "A Transaction-Based Unified Architecture for Simulation and Emulation." IEEE Transactions on Very Large Scale Integration (VLSI) Systems, vol. 13, No. 2 (2005) [retrieved on Oct. 4, 2017]. Retrieved from <https://www.cs.tufts.edu/~soha/paperArchive/2005%20A%20Transaction-Based%20Unified%20Architecture%20for%20Simulation%20and%20Emu>.*

Stickley et al. "Understanding the Accellera SCE-MI Transaction Pipes." IEEE Design and Test of Computers (2012) [retrieved on Oct. 4, 2017]. Retrieved from <http://ieeexplore.ieee.org/stamp/stamp.jsp?arnumber=6129480>.*

* cited by examiner

METHOD AND SYSTEM TO TRANSFER DATA BETWEEN HARDWARE EMULATOR AND HOST WORKSTATION

TECHNICAL FIELD

This application relates generally to emulation systems and, more specifically relates to methods and systems for efficient transferring of data between a hardware emulator and a software host workstation of the emulation system.

BACKGROUND

Sophisticated System on Chip (SoC) designs are rapidly evolving. The SoC designs being developed today have millions and millions of gates. The complexity of the designs combined with the use of devices using the SoC designs in industrial products of very high importance has made design verification an essential element in the semiconductor development cycle. Thus, prior to manufacture, the hardware designers frequently employ simulators and/or emulators to verify the functional behavior of the electronic devices and systems fabricated in accordance with their designs. One type of verification system for a hardware device under test (DUT) is a hardware emulation process that generally provides an effective way to increase verification productivity, speed up time-to-market, and deliver greater confidence in the final SoC product. It provides a processor based simulation acceleration/emulation system, which is in communication with a workstation that sends data to and from the DUT. Such data can include digital test vectors or real signals from a logic system in which the DUT is intended for.

Various mechanisms/models have been employed in the hardware emulation systems in order to transfer the data between the hardware emulators and the host workstation. One of the models present in the art to transfer the data between the hardware emulators and the host workstation is a Primary input/output (PIO) based data transfer model. FIG. 1 is a schematic diagram showing a prior art PIO-based data transfer model employed in an emulation system 100. The schematic diagram illustrates the emulation system 100 employed in the electronic design automation for verifying that a logic design conforms to its specification before the logic design is manufactured as integrated circuits (ICs). In the emulation system 100, a test bench 102 is established to perform verification processes on the logic design. Typically, the logic designs and test designs may be described using various languages, such as hardware description languages (HDLs) or other more abstract languages. The functional verification is being performed using an emulation process. In the emulation process, the logic design is being mapped into a hardware emulator 104 to provide a design under test (DUT) 106. The test bench 102 is being executed by a simulator on a host workstation 108. As shown in FIG. 1, data 110 is present in the DUT which has to be transferred to a memory buffer 112 on the test bench 102 running on the host workstation 108. In one example, the host workstation 108 may request the hardware emulator 104 to transfer the data for executing one or more tasks that require the use of the data. In order to transfer the data to the host workstation 108, the HDL process make a call with the data which is generated, in a same emulation/user clock cycle. As understood in the art, several approaches such as signal-level connections, high-level abstract message passing, and function-call-based interaction have also been employed to make the call. The function-call-based interaction is a common approach which is being employed. In the function-to-call approach, the data transfers is performed using function call arguments and is known as Direct Programming Interface (DPI).

In FIG. 1A, the HDL process makes a blocking DPI call with an input data that is generated in the same user clock cycle. The hardware emulator 104 then stops the clock cycle, and transfers the input data to the host workstation 108. The hardware emulator 104 then waits for output data from the host workstation 108 and then resumes the execution process once the output data from the host workstation 108 is available. In order to transfer the input data in the same user clock cycle, the hardware emulator 104 uses PIO pins 114. A compiler of the hardware emulator schedules all the PIOs 114 to be transferred at the same user clock cycle, because all of the input data needs to be available on the host workstation 108 at the same time. Thus, depending on the size (in bits) of the input/output data to be transferred, similar number of bits of the PIO pins 114 are utilized. If the size of the input/output data set becomes larger, it becomes a challenge for the compiler of the hardware emulator 104 to schedule all of the input/output data in one single timestamp. The challenge arises because PIO pins 114 are hardware resources and there is a pre-defined fixed number of PIO pins 114 present in the hardware emulator 104 of the emulation system 100. Thus, as the input/output data becomes larger than the pre-defined fixed number of PIO pins 114 connected to the hardware emulator 104, the compiler of the hardware emulator 104 fails to compile all of the input/output data in one single timestamp. At the same time, in a situation when the input data is in limits with respect to the fixed number of PIO pins 114, then although the compiler of the hardware emulator 104 is able to successfully compile the input data using the PIO pins 114 for transfer to the host workstation 108, but performance is not efficient because that large number of pins has to be transferred and optimal scheduling isn't achieved.

FIG. 1B is a schematic diagram showing a prior art memory-based data transfer model that is employed in the emulation system 100 to address the limited size data transfer drawback of the PIO-based data transfer model described in FIG. 1A. As illustrated in FIG. 1B, there is data 110, that may be present in the hardware emulator 104 or the host workstation 108. In one example, the data 110 is present in the hardware emulator 104 and has to be transferred to the host workstation 108. In order to transfer the data 110 from the hardware emulator 104 to the host workstation 108, the hardware emulator 104 may facilitate the transfers of the data 110 onto a memory 116 (positioned in the hardware emulator 104) using a plurality of memory ports 118. The host workstation 108 can then read/write the data 110 from the memory 116. The compiler of the hardware emulator 104 will schedule all of the data 110 from the memory ports 118 to be transferred at the same user clock cycle, because all of the data 110 needs to be available at the memory 116 at the same time. Thus, depending on the size (in bits) of the input/output data to be transferred, large number of memory ports 118 may have to be utilized, but this solves the limited size data transfer drawbacks of the PIO-based data transfer model as large amount of the data 110 can be transferred using the memory ports 118. Also, the current memory based transfer model uses large number of memory ports 118 to copy the large amounts of data 110 to the memory 116 in the same user clock cycle to avoid using other available cycles to copy the data 110 to the memory 116 since the use of other cycles to copy the data 110 affects the schedule and performance of the emulation system 100. However, it has been observed that for large sizes of data transfer using the memory-based transfer model, the large number of the memory ports 118 required in same clock cycle becomes the bottleneck and the performance is not efficient because optimal scheduling isn't achieved and the performance becomes extremely slow at the run-time.

Therefore, there is a need in the art for methods and systems that addresses the above mentioned drawbacks of the conventional techniques employed for data transfer in an emulation system, and thereby able to achieve optimal performance for compiling time as well as runtime when large amount of data has to be transferred between the hardware emulator and the host workstation of the emulation system.

SUMMARY

Methods and systems disclosed herein attempt to address the above issues and may provide a number of other benefits as well. Methods and systems of an emulation system described herein provide a memory based data transfer technique to transfer data between a hardware emulator and a host workstation that solves the above mentioned drawbacks of the conventional techniques being employed to transfer the data between the host workstation and the hardware emulator of the emulation system. In an embodiment, the data is transferred between the hardware emulator and the host workstation using a single memory port per uncontrolled clock cycle that is running the hardware emulator.

In one embodiment, an emulation system comprises a first computing device comprising a processor configured to generate a synchronization clock signal on receiving a data transfer request, the first computing device further comprises a first non-transitory machine-readable memory buffer storing machine readable binary data; an emulator controller configured to receive the synchronization clock signal from the first computing device; and a memory port controller configured to initiate transfer of the machine readable binary data from the first non-transitory machine-readable memory buffer to a non-transitory machine-readable hardware memory, in response to receiving the synchronization clock signal from the emulator controller, during a latency period of the synchronization clock signal.

In another embodiment, a processor-implemented method for executing transfer of machine readable binary data between a first computing device and a second computing device, the method comprises receiving, by a processor of the first computing device, a request to transfer the machine readable binary data, the machine readable binary data is stored in a first non-transitory machine-readable memory buffer on the first computing device; generating, by the processor, a synchronization clock signal on receiving the request; transferring, by the processor, the machine readable binary data from the first non-transitory machine-readable memory buffer to a non-transitory machine-readable hardware memory during a latency period of the synchronization clock signal; and initiating, by the processor, transfer of the machine readable binary data from the non-transitory machine-readable hardware memory to a second non-transitory machine-readable memory buffer on the second computing device at the end of the latency period of the synchronization clock signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1A:
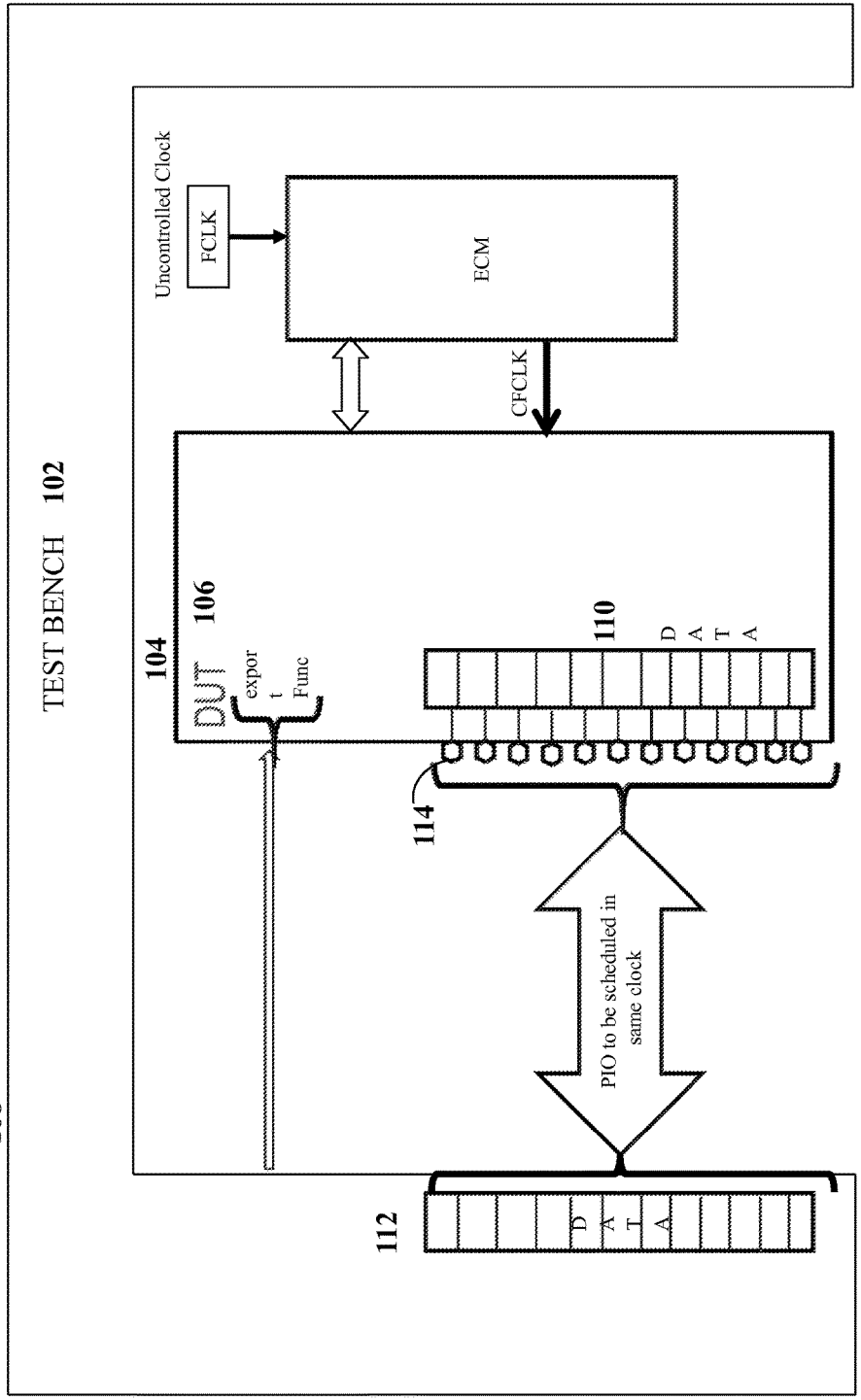
FIG. 1A is a schematic diagram showing a prior art PIO-based data transfer model employed in an emulation system.
Figure 1B:
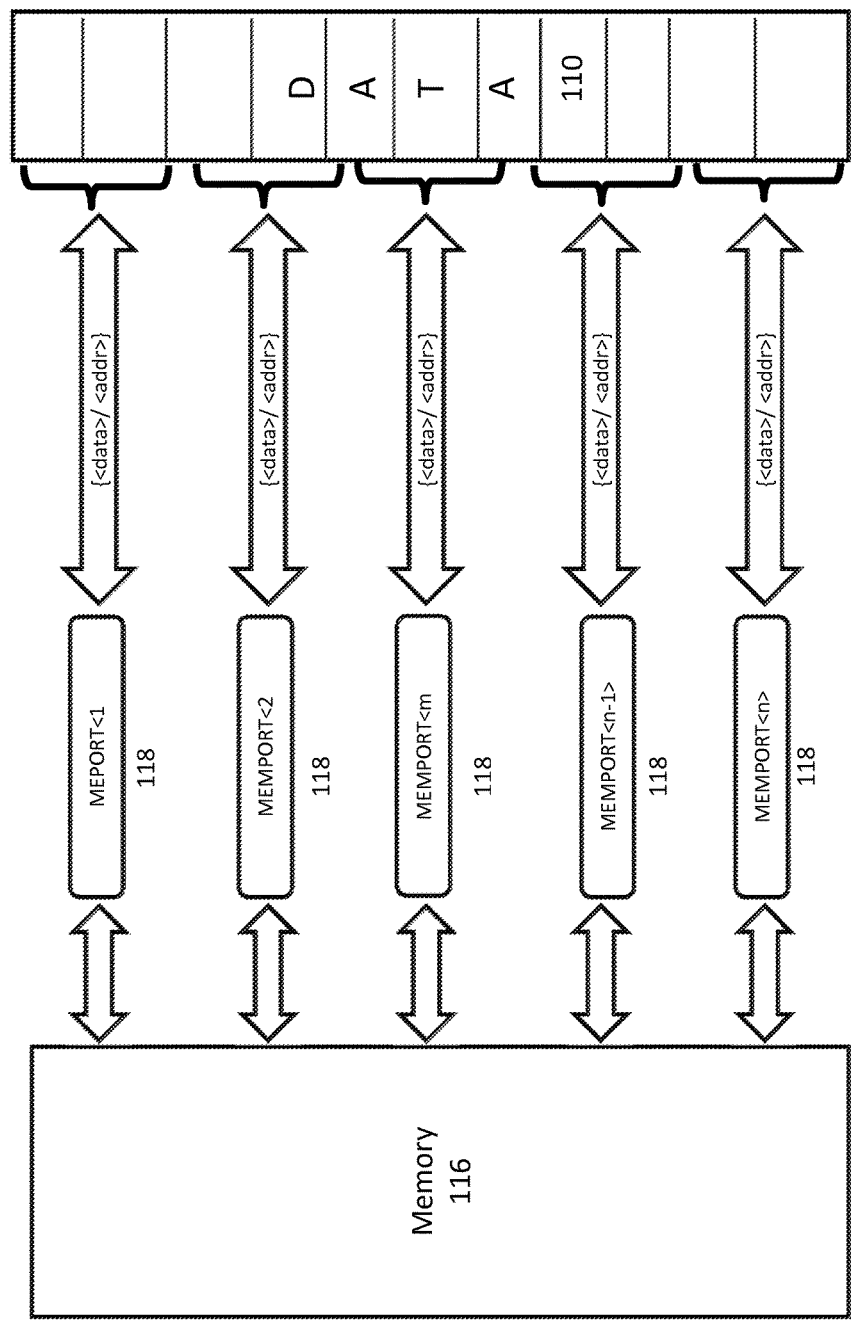
FIG. 1B is a schematic diagram showing a prior art memory-based data transfer model employed in an emulation system.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

An emulation system is employed in the electronic design automation for verifying that a logic design conforms to its specification before the logic design is manufactured as integrated circuits (ICs). In the emulation system, a test bench is established to perform verification processes on the logic design. The logic designs and test designs may be described using various languages such as hardware description language (HDL). The functional verification is performed using an emulation process. In the emulation process, the logic design is being mapped into a hardware emulator to provide a design under test (DUT). The test bench is executed by a simulator on a host workstation. During the emulation process, there is a transfer of data between the host workstation and the hardware emulator. In one example, the data maybe present in the DUT which has to be transferred to the test bench running on the host workstation on receiving a request from the host workstation. On receiving the data transfer request, the DUT generate a synchronization signal. The synchronization signal is then communicated to an emulation controller that controls the operations of the emulation system. The emulation controller communicates the synchronization signal to the test bench to let indicate to the test bench when test bench can start reading the data from the DUT. There is a delay between when the synchronization signal was raised in the DUT to the time the synchronization signal is communicated to the host workstation or the test bench. This delay occurs because the communication of the synchronization signal is also a kind of data transfer. In one example, it is a one bit data transfer. The host workstation needs to receive some data in order to start reading of the data from the host workstation. The emulation system is configured to use this delay or latency to start copying the data from a first memory buffer in the DUT into the hardware memory in the background using the uncontrolled clock. Thus, by the time the host workstation start reading the data from the hardware memory, the data has already been copied into the hardware memory from the first memory buffer.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2A:
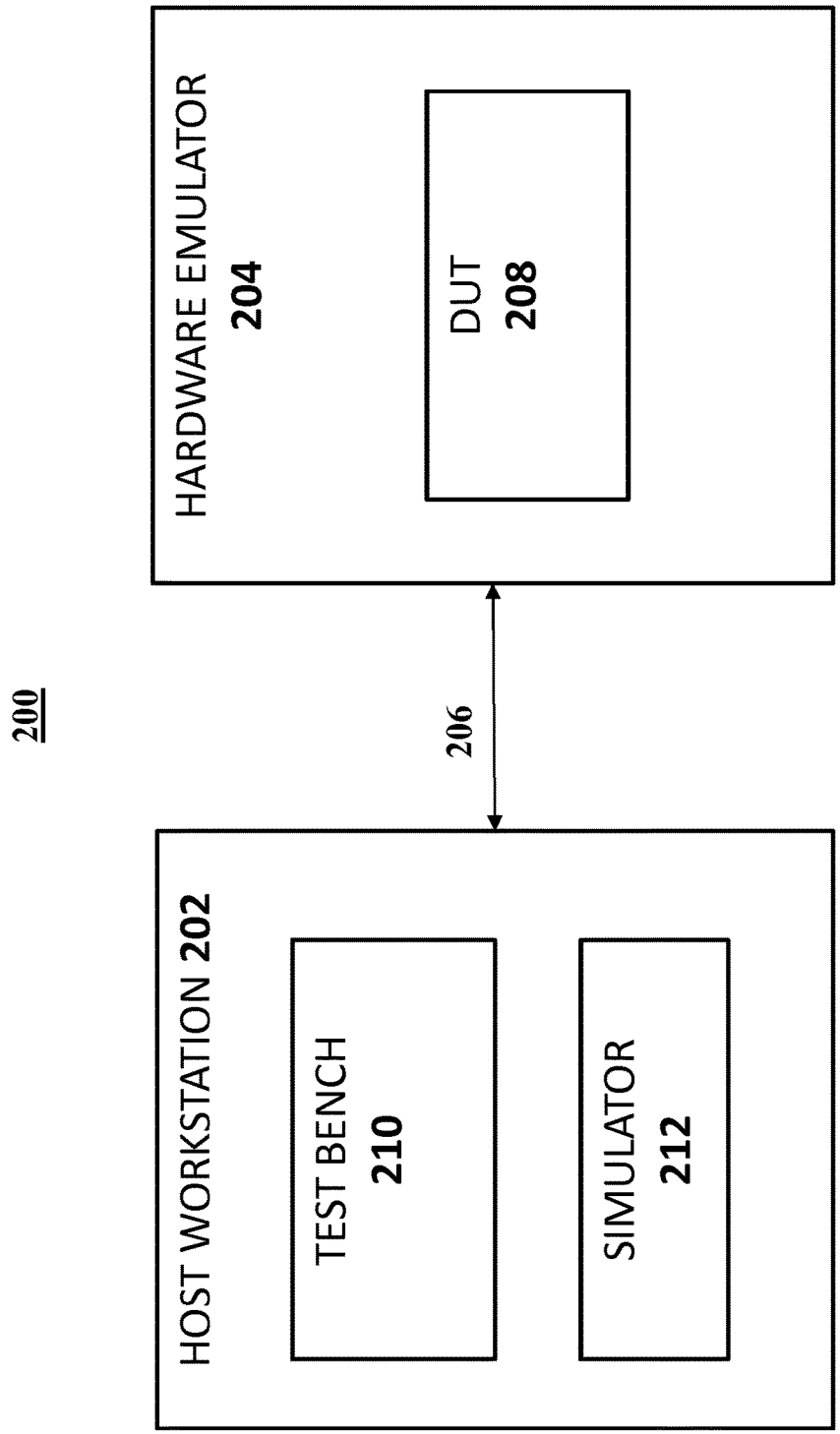
FIG. 2A is a block diagram of an illustrative emulation system.

FIG. 2A is a block diagram of an illustrative emulation system 200. In electronic design automation, a task of functional verification is to verify that a logic design conforms to its specification before a logic design is manufactured as integrated circuits (ICs). In order to perform the verification process, a test design is established on the logic design (hereinafter referred to as a "test bench"). The functional verification is performed using an emulation process where the logic design is mapped into an accelerator to provide a design under test (DUT), and the test bench is executed by a simulator on a computer or a host workstation. The emulation process allow the logic design to run much faster on the computer or the host workstation. In one embodiment, an emulation methodology is employed where the test bench runs on a software simulator and communicates with the DUT on a hardware emulator. The test bench may communicate to the DUT through an abstraction bridge. The abstraction bridge facilitates the exchange of messages between the test bench running on the simulator and the DUT running on the hardware accelerator. The exchange of messages may also be facilitated using a transactor which may compose a series of clocked events from the DUT running on the hardware accelerator into a single message for the test bench running on the simulator.

The emulation system 200 includes a first computing device and a second computing device. In the instant embodiment, the second computing device is the host workstation 202 and the first computing device is the hardware emulator 204. The host workstation 202 is coupled to the hardware emulator 204 via a communication link 206. In an embodiment, the host workstation 202 may include any type of a general purpose computer or a specific purpose computer. The hardware emulator 204 may include any type of acceleration or emulation platform. The hardware emulator 204 is configured with the DUT 208. The communication link 206 includes any type of high-speed bus for the transfer of signals between the host workstation 202 and the hardware emulator 204. The host workstation 202 is loaded with the test bench 210. The test bench 210 is configured to perform tests on the DUT 208 for functionally verifying the logic design of the DUT 208. The test bench 210 defines a verification environment having one or more software models configured to communicate with one or more hardware models. In one embodiment, the one or more software models may be written using a programming language, such as C/C++, SystemC, or SystemVerilog, and are compiled for execution by the simulator 212. Further, the one or more software models may comprise various test algorithms and routines for functional verification. The one or more hardware models may be specified using a synthesizable language, for example, an HDL or synthesizable SystemC, and are compiled into a form suitable for execution by the hardware emulator 204. The test bench 210 may further include one or more processes that call a task in order to communicate with the logic design.

Figure 2B:
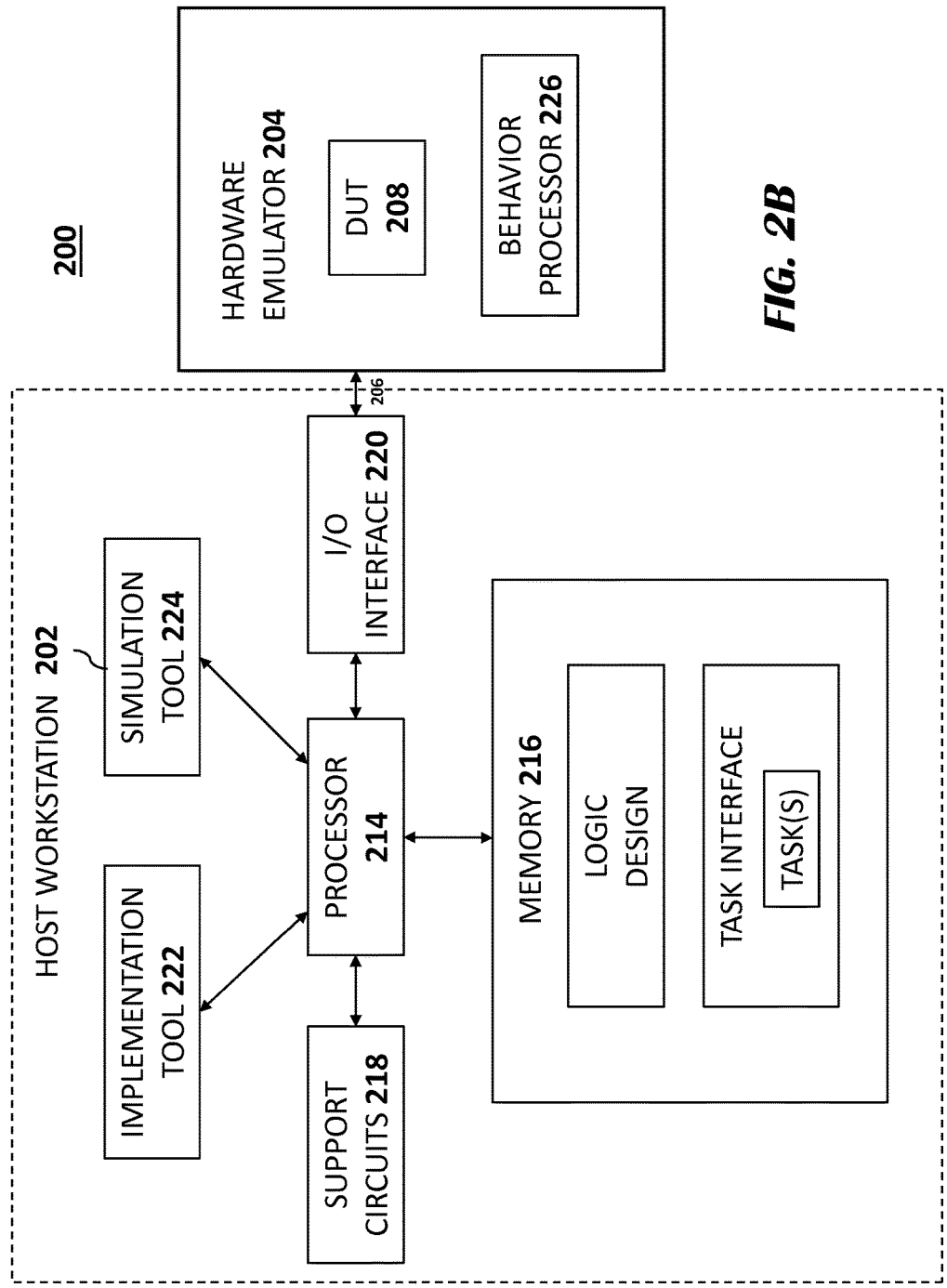
FIG. 2B is a block diagram depicting components of an illustrative emulation system.

FIG. 2B is a block diagram depicting components of the emulation system 200. The emulation system 200 includes the host workstation 202 coupled to the hardware emulator 204 via the communication link 206. The communication link 206 comprises any type of bus or link for the transfer of data between the host workstation 202 and the hardware emulator 204. The host workstation 202 may include a processor 214, a memory 216, various support circuits 218, and an I/O interface 220.

The processor 214 includes suitable logic, circuitry, and interfaces that are operable to execute one or more instructions to perform predetermined operations/tasks. The processor 214 can be realized through a number of processor technologies known in the art. The examples of the processor 214 include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. In an embodiment, the processor 214 includes a Graphics Processing Unit (GPU) that executes the set of instructions to perform one or more processing operations.

The memory 216 stores a set of instructions, the logic design, tasks, and the data. Some of the commonly known memory 216 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the memory 216 includes the one or more instructions that are executable by the processor 214 to perform specific operations. It is apparent to a person having ordinary skills in the art that the one or more instructions stored in the memory 214 enable the hardware of the transaction based acceleration verification system 200 to perform the predetermined operations/tasks. The support circuits 218 for the processor 214 include conventional cache, power supplies, clock circuits, data registers, I/O interfaces, and the like. The I/O interface 220 may be directly coupled to the memory 216 or coupled through the processor 214. The I/O interface 220 may also be configured for communication with the hardware emulator 204 via the communication link 206.

The host workstation 202 may be loaded with an implementation tool 222 and a simulation tool 224. The implementation tool 222 is configured to translate a hardware description of the logic design into a gate-level description, which is then translated into a physical description that can be loaded into the hardware emulator 204 as DUT 208. The gate-level description produced by the implementation tool 222 may include a register transfer level (RTL) netlist or the like. In an embodiment, the DUT 208 for emulation is usually provided in the form of register transfer level (RTL) description or gate-level netlists. The physical description produced by the implementation tool 222 may comprise a bitstream. The simulation tool 224 is configured to compile and execute a test bench 210. The test bench 210 is configured to execute one or more verification processes on the DUT 208 for functionally verifying the logic design. The logic design and test bench 210 may be specified using a hardware modeling language, such as hardware description languages (HDLs) (e.g., VHDL or Verilog) or higher-level languages, such as SystemC, System Verilog, and the like, or programming languages, such as C, C++, and the like. In some cases, the logic design may include behavioral portions that are not directly synthesizable. Such behavioral portions of the logic design can be modeled in software, for example, compiled and executed via the simulation tool. Likewise, the test bench 210 may include synthesizable portions capable of being modeled in hardware. Such synthesizable portions of the test bench 210 may be synthesized and implemented in the hardware emulator 204. The term "tool" of the implementation tool 222 and the simulation tool 224 as used herein is meant to encompass software implementations, hardware implementations, or a combination of hardware and software implementations.

The host workstation 202 may further include a task stub (not shown), one or more run-time controllers (not shown), and a RPC channel memory (not shown). The one or more run-time controllers or the task stub may be separate elements in the host workstation 202 or may be part of the simulation tool 224. The RPC channel memory may be implemented in the memory 216. For example, the RPC channel memory may be an address space in the memory 216 maintained by the simulation tool 224. The run-time controller is configured to provide an input signal to a task server (not shown), and receive an output signal from the task server. In the simulation tool 224, the task stub is configured to manage remote procedure calls for communicating with the task server. The task stub is defined to be an automatic and time consuming process. The simulation tool 224 may manage threading for the task stub.

The hardware emulator 204 is a programmable device used in the verification of hardware design. The hardware emulator 204 may test and verify the operation of an integrated circuit, an entire board of integrated circuits, or an entire system without having to first physically fabricate the hardware. The hardware emulator 204 may comprise a computer for providing emulation support facilities, such as emulation software, a compiler, and a graphical user interface to allow a person to program the hardware emulator 204.

In an embodiment, the compiler may be a software module, which may be executed by the computer workstation or host emulator 202, and is configured to receive and compile a netlist design file containing the logical gate design of an IC, and then to generate a virtual logic file based on the compiled netlist. The compiler "maps" the IC's logic and timing of operations into the hardware components of the transaction based acceleration verification system 200 to generate instructions for the components of the transaction based acceleration verification system 200 to cause the emulation system 200 to function as the IC would function. The compiler module may include a partitioner and scheduler component or function, though it should be appreciated that the compiler may be segmented into any number of component software modules. In an opening import phase, the compiler receives the netlist and begins compiling. Here, the compiler may parse the logic gates of the netlist into a database format. A partitioner may determine which part of the netlist is going to be executed by which type of hardware resource of the emulation system 200. Then, a scheduler may determine for that part of the netlist which of the hardware resources should execute the part of the netlist and when in the execution lifecycle the netlist should be executed. The compiler may be capable of determining the status of components of the emulation system 200, including the allocation status or whether the netlist is broken (i.e., marked-out).

In an embodiment, the emulation software may be a software module, which may be executed by the computer workstation or host workstation 202, and is configured to track the status and control the performed of components of the transaction based acceleration verification system 200. The emulation software may determine which components of the emulation system 200 are available or unavailable to receive parts of the virtual logic generated by the compiler. In some cases, the emulation software continuously polls or self-tests the emulation system 200 for faulty hardware components. In some cases, the emulation software may determine the status of components of the emulation system 200 when the virtual logic is being loaded into the hardware components of the emulation system 200. In some embodiments, the emulation software may determine whether the instructions of the virtual logic should be revised from the instructions that were originally compiled. The emulation software may be configured to automatically make this determined, or may receive instructions from an administrator through a GUI to review and revise the complied instructions. In some cases, these software modules may be executed in whole or in part on a computer workstation, such as an administrator or user computer, which may communicate data and instructions associated with the respective software module to and from the host workstation 202. It should be appreciated that the computer workstation may be any computing device including a processor and non-transitory machine-readable storage that render the computer workstation capable of performing the various tasks and processes described herein. The non-limiting examples of computer workstation may include laptops, tablets, server computers, or the like.

The hardware emulator 204 may further comprise an emulation engine for performing the emulation. The emulation engine forms a core element of the hardware emulator 204. The emulation engine generally comprises an emulation board. The emulation board comprises emulation circuits. The emulation circuit comprises several emulation processors. The emulation processor is capable of mimicking a logic gate. The hardware emulator 204 may further comprise any type of emulation platform. For example, the hardware emulator 204 may include one or more programmable logic devices (PLDs), such as field programmable gate arrays (FPGAs) to perform the emulation. In one embodiment, the FPGA may be incorporated within or mounted on an expansion board, for example, a personal computer expansion board such as a Peripheral Component Interconnect (PCI) board. In another embodiment, the multiple expansion boards may be included in the hardware emulator 204. The one or more FPGAs may be mounted on each expansion board of the multiple expansion boards.

In one example, the emulation system 200 may include a rack. The rack may be any physical housing for components of the emulation system 200. The rack houses a plurality of emulation logic boards that are organized into board clusters. In some cases, the rack may be a computing device, such as a server computer or workstation computer, configured to implement various emulation functions. The rack may physically house components of any type, such as board clusters, emulation logic boards, emulation chips, and buses hosting data signal communications. The board clusters may be logical and/or physical collectives of one or more logic boards. The logic boards may be clustered for any number of reasons, such as creating proximity among a set of boards for more efficient signal transfer and processing between the boards of the cluster. It should be appreciated that clustering logic boards is often a design consideration, and, as such, other embodiments may cluster and/or disaggregate logic boards according to any number of different organizational patterns. The board clusters may be interconnected with one another by buses that may carry data signals transmitted to and from the board clusters. The buses may interconnect the logic boards of a particular board cluster, so that the logic boards may transmit and receive data signals to and from other logic boards within the same board cluster. The emulation logic boards may include computing hardware components capable of emulation functionality to emulate the design and functions of an IC or other circuitry. The logic board may comprise one or more emulation chips performing the functions used for emulation, and one or more buses interconnecting the emulation chips. The buses may be an optical, copper, or any other conductive material capable of carrying data signals. In operation, the buses may carry data signals transmitted to and from the emulation chips of the logic board. In some cases, the logic board may include one or more buses supporting communication between emulation chips on the same logic board and, in some cases, the logic board may include one or more buses supporting communication between emulation chips located on other logic boards of the emulation system 200.

The hardware emulator 204 can include any number of processors capable of performing the various tasks and processes for emulating an IC or other logical processing circuitry, multiplexers configured to direct data signals to and from the processors, buses for communicating data between the processors, and data lanes connecting the components of a processor. The hardware emulator 204 may be designed to mimic the functionality of any IC design, based on programmable logic that configures the behavior of the emulator chips to mimic the particular IC. In this way, circuitry designers may prototype new IC designs using processor-based emulation, before actually manufacturing the IC and host device. The hardware emulator 204 may receive a set of instructions to execute from a compiler, which may be a software module component executed by a computing device. In operation, the compiler compiles a netlist file representing the IC's design. The result of compiling the netlist generates virtual logic comprising instruction sets for the components (e.g., multiplexers) of the hardware emulator 204. In some embodiments, the processors of the hardware accelerator 204 may be organized into any number of processor clusters to efficiently share data inputs, data outputs, and data references. For example, multiple processors of the hardware accelerator 204 may be clustered together such that the processors reference the same data array and/or instruction store. As understood in the art, the hardware emulator 204 operate on clock cycles that enable each of the hardware emulators 204 to be synchronized. Certain aspects of the hardware emulator 204 enable communications between the hardware emulators 204 between the clock cycles to provide for delays, testing, and debugging, and other features.

The hardware emulator is further provided with an emulator controller or an emulator control module (ECM) that provides for control of operations of the hardware emulator. The ECM may comprise software instructions that may be resident within memory. The ECM may also be configured to supervise the hardware emulation of the distributed portions such as the start and stop the emulation at the various hardware emulators in a synchronized manner, coordinate timestep emulation, monitor the state of hardware emulators etc. Thus, the various hardware emulators may be configured to coordinate the emulation of the DUT by communication with each other and with the ECM using messages.

The emulation system 200 may further comprise an instructional database (not shown) and a resource index database (not shown). The instruction database may store records of virtual logic or instruction sets compiled by the compiler from netlist files. The instruction database may be hosted in non-transitory machine-readable storage medium of any computing device capable of hosting the instruction database and performing the various tasks and processes associated with the instruction database, as described herein. The instruction database may receive, from a device executing the compiler, instructions compiled from the netlist file of an IC. In some cases, the instructions may contained within a virtual logic file generated by the compiler. At download time, when the hardware components of the emulation system 200 are loaded with the instructions, the instruction database may transmit or provide the instructions to the components, and the instruction sets are loaded into the memories of the respective hardware components within the emulation logic boards. The resource index database may be a database or a machine-readable computer file (e.g., marked-out list) containing records for components of the emulation system 200. The resource index database or similar resource may be hosted in non-transitory machine-readable storage medium of any computing device capable of hosting the resource index database and performing the associated tasks and processes described herein. The records may indicate various types of status information about components, such as allocation status, availability status (e.g., busy, broken, incompatible), execution status (e.g., busy, idle), and the like. The resource index database may be periodically updated by modules of the emulation system 200.

The hardware emulator 204 of the emulation system 200 may further include a behavior processor 226. The finite state machine (FSM) implementation of the task server meets the behavior processor 226 requirements and can be directly compiled into the behavior processor 226. The behavior processor 226 provides an architecture for implementing behavioral aspects of the logic design, for example, HDL code that is not directly synthesizable.

Figure 3:
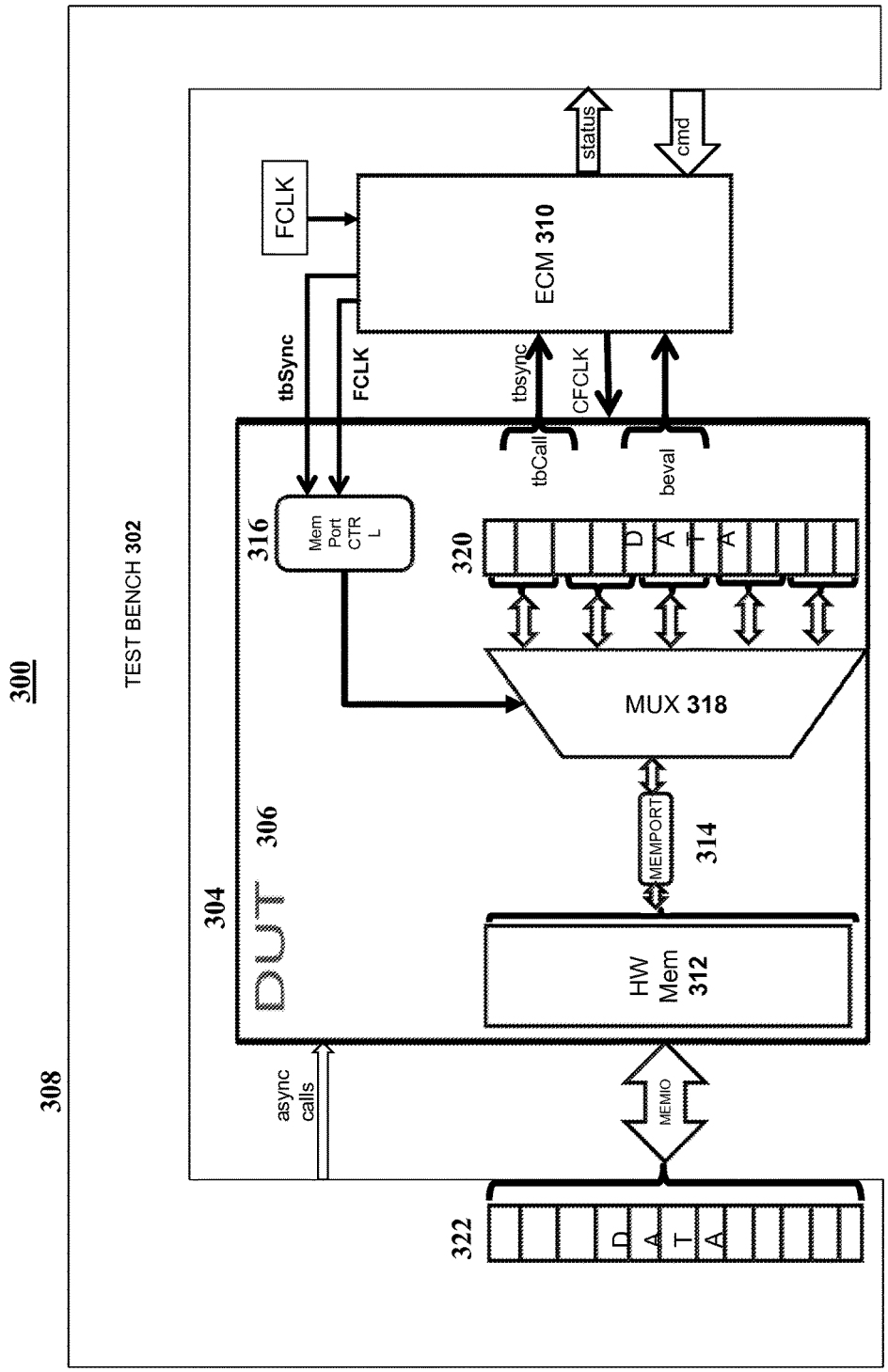
FIG. 3 is a block diagram depicting for transfer of data between a host workstation executing a test bench and a hardware emulator executing a design under test in an emulation system.

FIG. 3 is a block diagram depicting transfer of data between a host workstation executing a test bench and a hardware emulator executing a design under test in an emulation system 300. As illustrated in FIG. 3, each of the host workstation 308 and the hardware emulator 304 are in communication with the ECM 310. The hardware emulator 304 is further includes a hardware memory 312, a memory port 314, a memory port controller 316, a multiplexer 318, and the data 320.

The ECM 310 is configured to allow signals from various sources (processors, serial links, pins, and IOPs) to be combined logically and redirected to other resources. The ECM 310 includes programmable or configurable logic, and configurable select and delays, configurable logic functions and delays. In one embodiment, the configurable devices may be programmed with machine-executable code that enables the configurable devices to perform the select, logic functions, and delays. The ECM 310 may also include operational parameters that are outputs from the hardware emulator 304 and the host workstation 308. A register may be used to store the operational parameters. In one embodiment, rather than using an FPGA, the ECM 310 is configured using programmable MUXES, programmable function tables and delays. The ECM 310 is used to control certain operations of the emulator system 300. Such control may provide for synchronization, testing, debugging, data transfers, running of the hardware emulator 304. The ECM 310 further includes a piece of logic that controls the communication associated with the hardware emulator 304 including, but not limited to, indicating to the hardware emulator 304 when the hardware emulator 304 needs to execute, when the hardware emulator 304 needs to stop working, and the functions to be performed by the hardware emulator 304.

The hardware emulator 304 and the integrated circuits such as microprocessors require a clock signal having a relatively large voltage swing. The controlled oscillators of various types may be used to generate a clock on chip for clocking logic. In one example, differential oscillator signals or single-ended oscillator signals are used. In another example, uncontrolled clock signals and the controlled clock signals are used to drive the hardware emulator 304. The uncontrolled clock (represented as FCLK in FIG. 3) is a clock of the hardware emulator 304. The uncontrolled clock continuously runs at a pre-determined frequency. In one embodiment, the compiler determines the frequency of the uncontrolled clock. The determination is based on the schedule for a given logic design the hardware emulator 304 can manage. In other words, the uncontrolled clock represents a predefined speed at which the hardware emulator 304 is running. The controlled clock (represented as CFCLK in FIG. 3) is generated by the ECM 310. The ECM 310 uses the uncontrolled clock to generate the controlled clock. The ECM 310 uses the controlled clock as a signal or input to the DUT 306. In one embodiment, the controlled clock is used to initiate the starting and stopping the running of the hardware emulator 304. In another embodiment, the controlled clock is used to manage and control the simulation time of the hardware emulator 304. In other words, the controlled clock also represents an emulation cycle of the emulation system 300.

A synchronization clock signal (represented as "tbSync" in FIG. 3) is generated by the hardware emulator 304 to indicate a current status of the DUT 306 to the ECM 310. The current status includes information related to current tasks being performed by the hardware emulator 304. In the instant embodiment, the hardware emulator 304 uses the synchronization clock signal to indicate to the ECM 310 when the hardware emulator 304 receives a request to transmit or receive data from the host workstation 308. In one example, when the hardware emulator 304 receives the request from the host workstation 308 to transfer some data from the hardware emulator 304 to the host workstation 308, then the hardware emulator 304 generates the synchronization clock signal and send it to the ECM 310. A test bench call ("tbcall") indicates an input received by the hardware emulator 304 regarding a request to do execution of one or more tasks in the host workstation 308. The request may include, but not limited to, transmit or receive the data, perform the running of the simulator on the test bench 302.

A BEVAL represented in FIG. 3 is a behavior cycle of the emulation system 300. In one example, the BEVAL represents a simulation timestamp. In another example, the BEVAL represents a simulation time required by the hardware emulator 304 for a plurality of tasks being executed by the hardware emulator 304. In yet another example, when the hardware emulator 304 is asked to execute the plurality of tasks in a single controlled clock cycle, and one or more tasks among the plurality of tasks have a certain behavior logic that doesn't allow the one or more tasks to be executed in the single controlled clock cycle, then the hardware emulator 304 sends the BEVAL to the ECM 310. The ECM 310 will then hold the controlled clock and use the uncontrolled clock to execute the one or more in the same controlled cycle.

A CMD input is a set of commands sent by the host workstation 308 to the ECM 310. In one example, when the hardware emulator 304 or the ECM 310 instructs the DUT 306 to stop, and transfers the control to the test bench 302 to execute, the ECM 310 then receives the CMD input by the host workstation 308 when the host workstation 308 is ready. In another example, when the host workstation 308 wants to push some data into the hardware emulator 304, then the host workstation 308 sends the CMD input to the ECM 310 to hold the controlled clock and transfer the data into the hardware emulator 304 prior to starting the controlled clock again.

An async call is an input from the test bench 310 to the hardware emulator 304 indicating a set of input which needs to be evaluated on the hardware emulator 304. The host workstation 308 will generate the async call by copying the data onto the hardware emulator 304. The data received by the hardware emulator 304 will be evaluated by the hardware emulator 304, and then a TB call will be generated to instruct the ECM 310 when the evaluation is complete. The ECM 310 will then notify back to the host workstation 308 when the evaluation is complete.

A memory input/output (MEMIO) is a bus to transfer the data between the hardware emulator 304 and the host workstation 308. The MEMIO is a bus formed of any material capable of transmitting data from the hardware emulator 304 to destinations in the emulation system 300 that are not located on the hardware emulator 304, such as the host workstation 308, an external memory drive (not shown), or any other computing resource of the emulation system 300 that is not housed on the emulation system 300. In the instant embodiment, the emulation system 300 includes a single serial bus configured to transmit the data from the hardware memory 312 to the host workstation 308 and vice versa. In an embodiment, MEMIO bus is a PCI express bus. The PCI Express bus further uses write or message packets to pass special events such as interrupt, power up or down, or hot-plugged. In one example, an instruction cache/memory is useful to store parameters for frequently called events. Further, applying standard interface protocol such as PCI Express eliminates the requirement of extra interface conversion logic, reducing the development time, and the cost. It also provides low level error correction, and as a result offsets the load from application logic. The PCI Express bus over optical fiber provides a fast, low noise, and long distance connection. Taking advantage of high throughput and short latency of PCI Express bus, software preparation and runtime overhead is minimized, and logic states, memory, and hardware status of hardware emulators are transferred at a much faster rate than conventional hardware emulation systems, for example within micro seconds. In another embodiment, an external processor may also provide tracing or logging features for debugging or resource management of the emulation system 200 without consuming bandwidth of the PCI Express bus interconnecting the host workstation 308 and the hardware emulator 304.

In one embodiment, the emulation system 300 may include a variety of multiplexers 318 residing outside of processors of the emulation chip of the hardware emulator 304. These multiplexers 318 may allow for connections between outputs or inputs of certain resources, such as processors, clusters of processors, and serial buses. In the instant embodiment, there is a single multiplexer. The multiplexer 318 structure of the present disclosure reduces the cost in emulation gates. The multiplexer 318 includes a selector as a logical switch that connects one of N inputs to one output as a function of a control signal. The structure is designed for circuit implementation reasons to minimize the area and cycle time.

The multiplexer 318 can be configured to select the address or the data set from a first memory buffer 320 in the hardware emulator 304 that needs to be copied to a second memory buffer 322 in the host workstation 308 at a given controlled clock cycle. The data is first copied by the multiplexer 318 from the first memory buffer 320 to the memory port 314 configured to receive the data from the multiplexer 318. The memory port 318 further receives the address along with data from the multiplexer 318 at which the received data needs to be copied by the memory port 314 in the hardware memory 312. For example, if the total data in the first memory buffer 320 is 512 bits and the memory port 314 is of 64 bits, then the multiplexer 318 selects data from 0 to 63 bits in a first uncontrolled clock cycle. Then data from 64 to 127 bits is selected in a second uncontrolled clock cycle and so on. The selection of the data for each uncontrolled clock cycle is done by the multiplexer 318 based on an input from the memory port controller 316. The memory port controller 316 reads the address of the data to be transferred to the memory port 314, and provides an input along with address to the multiplexer 318, which then maps the input addresses in the first memory buffer 320 to select the required bits of the data for a given uncontrolled clock cycle and copies it into the memory port 314.

In an embodiment, the data is transferred from the first memory buffer 320 to the hardware memory 312 via the memory port 314. In one example, the hardware memory 312 and the memory port 314 are of same size (e.g., 64 bits wide). The size of data to be copied from first memory buffer 320 to the hardware memory 312 via the memory port 314 is 1024 bit. Thus, for copying 1024 bit data using the 64 bit wide memory port 314 into the hardware memory 312 having 64 bit width and 16 word deep, it will require 10 uncontrolled cycles, that is, one word is copied per one uncontrolled clock cycle.

The hardware memory 312 is configured to receive the data from the memory port 314. The hardware memory 312 is further configured to transfer the received data to the first memory buffer 320. In one embodiment, the hardware memory 312 may be a random access memory.

The memory port controller 316 is configured to receive one or more input signals from the ECM 310, and send an output signal to the multiplexer 318. As represented in the FIG. 3, the ECM 310 sends the uncontrolled clock signal and the synchronization clock signal to the memory port controller 316. The synchronization clock signal received by the memory port controller 316 directs the memory port controller 316 to start facilitating the copying of the data from the first memory buffer 320 to the hardware memory 312 via the memory port 314. The memory port controller 316 further receives the uncontrolled clock signal and on each uncontrolled clock signal the memory port controller 316 generates a first source address (the address of the data that need to be copied from the first memory buffer 320) and a first destination address (the address at the hardware memory 312) where the data extracted from the first source address has to be copied. The first source and destination address is then transmitted by the memory port controller 316 to the multiplexer 318. With each received uncontrolled clock cycle, the memory port controller 316 continues to generate the source and destination address until entire data from the entire data from the first memory buffer 320 is copied into the hardware memory 312.

Figure 4:
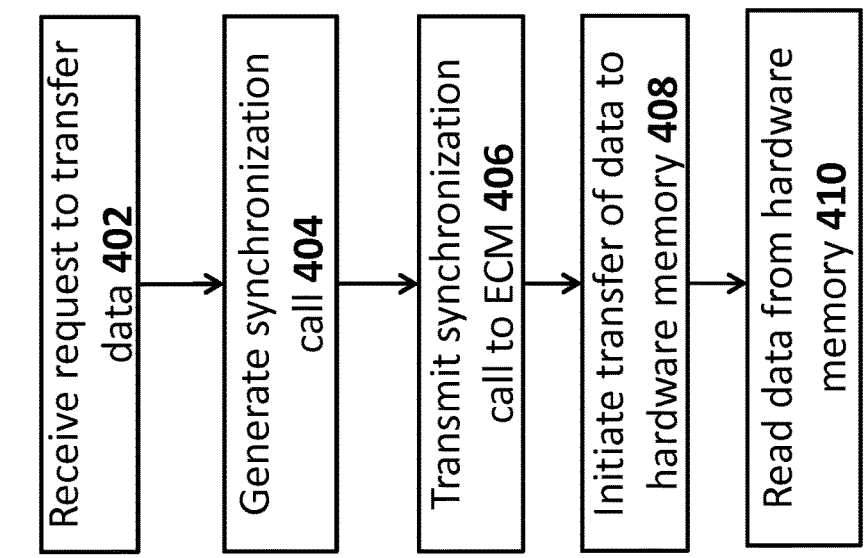
FIG. 4 is a flow diagram depicting a method of transfer of data between a host workstation executing a test bench and a hardware emulator executing a design under test in an emulation system.

FIG. 4 is a flow diagram depicting an exemplary embodiment of a method of transfer of data between a hardware emulator and a host workstation in an emulation system.

At step 402, a processor of the hardware emulator receives a request to transfer the data. The data to be transferred is present in the second memory buffer on the hardware emulator. At step 404, the processor of the hardware emulator generates the tbCall and tbsync signals on receiving the request. At step 406, the processor of the hardware emulator transmits the generated tbCall and tbsync signals to the emulator controller for processing the request. The emulator controller then stops the controlled clock cycle of the hardware emulator. In order to process the request, the emulator controller sends the tbsync signal to the memory port controller. At the same time, the emulator controller sends the tbsync signal to the host workstation to start reading the data from the hardware memory of the DUT. Although the emulator controller sends the tbsync signal to both the memory port controller and the host workstation to the same time, there is a delay between when the memory port controller starts executing and when the host workstation starts executing. This delay is sometimes called a "latency period."

At step 408, after the memory port controller receives the tbSync signal, the memory port controller triggers a selector logic controller that initiates the transfer of data from the first memory buffer to the hardware memory. The selector logic controller includes a memory port and a multiplexer. The multiplexer upon receiving the input from the memory port controller, then selects the data from the first memory buffer and sends to the memory port. The data is then sent from the memory port to the hardware memory. The data from the first memory buffer is transferred to the hardware memory during the latency period of the tbsync signal. In one example, the latency period indicates the time period between when the tbsync is generated by the DUT and when the host workstation starts reading the data from the hardware memory of the DUT on receiving a signal from the emulator controller. In another example, the latency period indicates a time period between when memory port controller starts data transfer on receiving the tbsync signal from the emulator controller and when the host workstation starts reading the data from the DUT on receiving the tbsync signal from the emulator controller. In other words, at least some portion of the data from the first memory buffer is written in the hardware memory before the host workstation receives a signal to start reading the data from the hardware memory.

At step 410, the processor of the hardware emulator initiates transfer of the data from the hardware memory to a second memory buffer on the host workstation at the end of the latency period of the tbsync signal. As soon as the host workstation receives the tbsync signal, the host workstation starts reading the data from the hardware memory and starts copying it into the second memory buffer. Due to the presence of latency period, at some portion of the data from the first memory buffer has already been written into the hardware memory before the host workstation starts reading the data from the hardware memory and copy it into the second memory buffer. Thus, as the data is being written into the hardware memory from the first memory buffer, at the same time the host workstation starts reading the data from the hardware memory.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An emulation system comprising:
   a first computing device comprising a processor configured to generate a synchronization clock signal on receiving a data transfer request, the first computing device further comprises a first non-transitory machine-readable memory buffer storing machine-readable binary data;
   an emulator controller configured to receive the synchronization clock signal from the first computing device; and
   a memory port controller configured to trigger a multiplexer to select a portion of the machine-readable binary data from a particular address of the first non-transitory machine-readable memory buffer based on a size of a memory port and initiate transfer of the selected portion of the machine-readable binary data to a non-transitory machine-readable hardware memory via the memory port, in response to receiving the synchronization clock signal from the emulator controller, during a latency period of the synchronization clock signal such that a second computing device reads the machine-readable binary data from the non-transitory machine-readable hardware memory in response to receiving the synchronization clock signal from the emulator controller at the end of the latency period of the synchronization clock signal,
      wherein the latency period of the synchronization clock signal corresponds to a physical time delay between a time when the first computing device generates the synchronization clock signal and the time when the second computing device receives the synchronization clock signal from the emulator controller,
   whereby the emulation system optimizes scheduling during compile time and increases performance during runtime.

2. The emulation system of claim 1, the second computing device comprising a second non-transitory machine-readable memory buffer configured to receive the machine-readable binary data from the non-transitory machine-readable hardware memory at the end of the latency period of the synchronization clock signal.

3. The emulation system of claim 1, wherein the first computing device is a hardware emulator running on an uncontrolled clock signal.

4. The emulation system of claim 3, wherein the machine-readable binary data is transferred using the uncontrolled clock signal from the first non-transitory machine-readable memory buffer to the non-transitory machine-readable hardware memory during the latency period of the synchronization clock signal.

5. The emulation system of claim 1, wherein the emulator controller is further configured to execute the first computing device using a controlled clock signal, and wherein the emulator controller is further configured to generate the controlled clock signal using an uncontrolled clock signal.

6. The emulation system of claim 5, wherein the emulator controller stops the controlled clock signal to the first computing device on receiving the synchronization clock signal from the first computing device.

7. The system of claim 1, further comprising a system bus connecting the first computing device and the second computing device, wherein the system bus is a PCI Express bus.

8. The system of claim 1, wherein the transfer of the machine-readable binary data comprises reading or writing of the machine readable binary data.

9. The emulation system of claim 1, further comprising a selector logic controller configured to receive instructions from the memory port controller to transfer the machine-readable binary data from the first non-transitory machine-readable memory buffer to the non-transitory machine-readable hardware memory.

10. The emulation system of claim 9, wherein the selector logic controller comprises the multiplexer and the memory port.

11. The emulation system of claim 10, wherein the multiplexer is configured to select the portion of the machine-readable binary data from the first non-transitory machine-readable memory buffer for transferring to the memory port at a given uncontrolled clock signal based on at least one condition selected from a group consisting of source addresses, destination addresses, size limit of data to be transferred, and order of data to be transferred.

12. The emulation system of claim 11, wherein the memory port is configured to transfer the portion of the machine-readable binary data received from the multiplexer to a location on the non-transitory machine-readable hardware memory based on one or more attributes associated with the portion of the machine-readable binary data received along with the portion of the machine-readable binary data.

13. A processor-implemented method for executing transfer of machine-readable binary data between a first computing device and a second computing device, the method comprising:
receiving, by a processor of the first computing device, a request to transfer the machine-readable binary data, the machine-readable binary data is stored in a first non-transitory machine-readable memory buffer on the first computing device;
generating, by the processor, a synchronization clock signal on receiving the request;
transmitting, by the processor, the synchronization clock signal to a memory port controller to cause the memory port controller to trigger a multiplexer to select a portion of the machine-readable binary data from a particular address of the first non-transitory machine-readable memory buffer based on a size of a memory port and initiate transfer of the selected portion of the machine-readable binary data to a non-transitory machine-readable hardware memory via the memory port during a latency period of the synchronization clock signal; and
initiating, by the processor, transfer of the machine-readable binary data from the non-transitory machine-readable hardware memory to a second non-transitory machine-readable memory buffer on the second computing device at the end of the latency period of the synchronization clock signal,
wherein the latency period of the synchronization clock signal corresponds to a physical time delay between when the memory port controller triggers the multiplexer to select a portion of the machine-readable binary data on receiving the synchronization clock signal from the processor and when the second computing device receives the synchronization clock signal from the processor,
whereby an emulation system optimizes scheduling during compile time and increases performance during runtime.

14. The processor-implemented method of claim 13, further comprising transmitting, by the processor, the synchronization clock signal to an emulator controller.

15. The processor-implemented method of claim 13, further comprising executing, by the processor, a selector logic controller to transfer the machine-readable binary data from the first non-transitory machine-readable memory buffer to the non-transitory machine-readable hardware memory.

16. The processor-implemented method of claim 13, wherein the first non-transitory machine-readable memory buffer, the non-transitory machine-readable hardware memory, and the second non-transitory machine-readable memory buffer have a same total bit size.

17. The processor-implemented method of claim 13, further comprising:
initiating, by the processor, the transfer of the machine-readable binary data from the non-transitory machine-readable hardware memory to the second non-transitory machine-readable buffer through a system bus connecting the first computing device and the second computing device, wherein the system bus is a PCI Express bus.

18. The processor-implemented method of claim 15, wherein the selector logic controller comprises the multiplexer and the memory port.

* * * * *